United States Patent [19]

Kellermann et al.

[11] 4,096,953
[45] Jun. 27, 1978

[54] MECHANISM TO TRANSFER WORKPIECES BETWEEN LOCATIONS

[75] Inventors: Arnold LeRoy Kellermann, Goshen; David Ian McDonald, Cincinnati, both of Ohio

[73] Assignee: Cincinnati Milacron Inc., Cincinnati, Ohio

[21] Appl. No.: 779,732

[22] Filed: Mar. 21, 1977

[51] Int. Cl.² .......................................... B65G 47/91
[52] U.S. Cl. ............................. 214/1 BT; 214/1 BV; 214/DIG. 10; 74/25
[58] Field of Search ..................... 214/1 R, 1 B, 1 BS, 214/1 BB, 1 BT, 1 BD, 1 BV, 147 T, DIG. 10; 198/486; 74/25, 54

[56] References Cited

U.S. PATENT DOCUMENTS

| | | | |
|---|---|---|---|
| 2,061,358 | 11/1936 | Hunter et al. | 214/DIG. 10 X |
| 3,061,118 | 10/1962 | Halberstadt | 214/DIG. 10 X |
| 3,370,845 | 2/1968 | Newcomb | 214/1 BT X |
| 3,410,417 | 11/1968 | Fouse | 214/1 BD |
| 3,677,419 | 7/1972 | Giffen | 214/1 BV |
| 3,902,606 | 9/1975 | Rönbeck | 214/1 BV |

Primary Examiner—Frank E. Werner
Attorney, Agent, or Firm—Daniel P. Worth

[57] ABSTRACT

A mechanism to transfer small flat workpieces (chips) between locations has a pair of interlinked four bar mechanisms one of which mechanisms carries a chip spreading means operated by two cams so that the chip pickup and release means moves in substantially vertical and horizontal timed relation to pickup a number of chips, move through a shallow horizontal arc, simultaneously spread the chips further apart, drop the chip; and repeat. Mechanism is disclosed for moving a plurality of chips of biaxially orientable polystyrene between a heating means and a forming means while laterally increasing the spacing between the chips.

37 Claims, 15 Drawing Figures

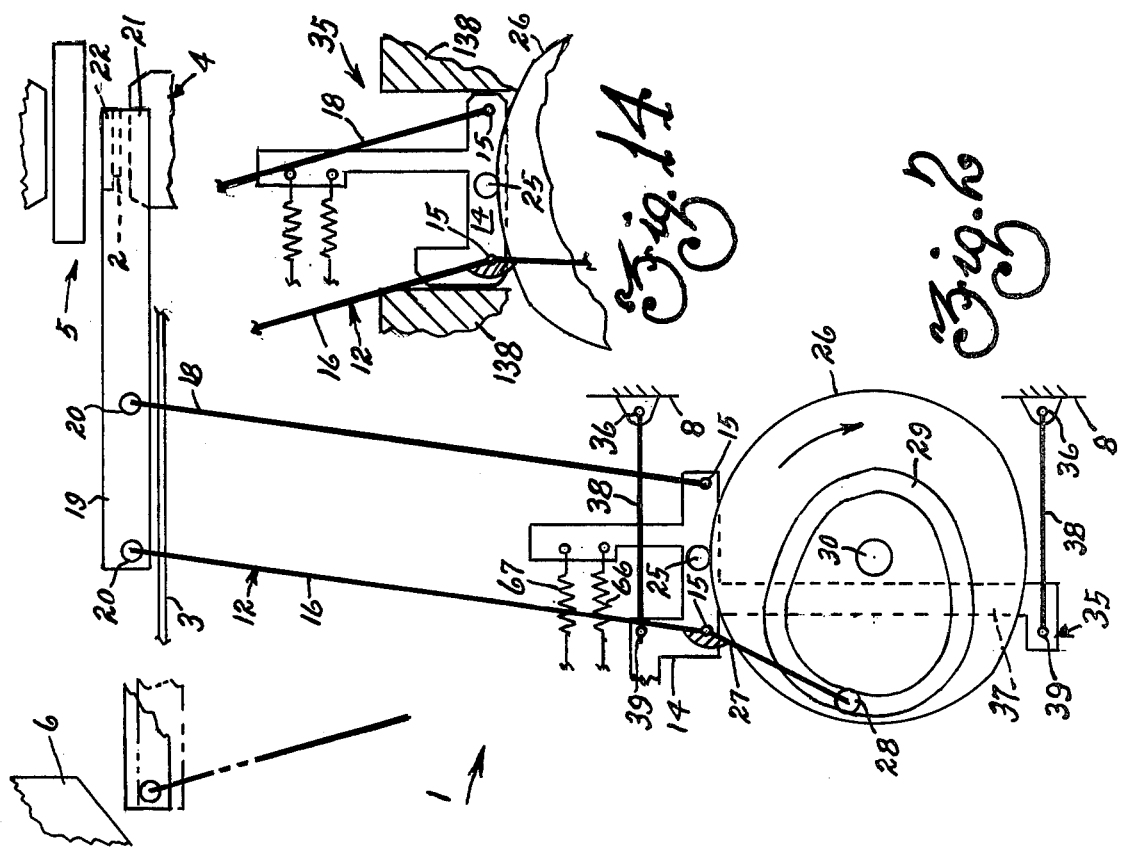
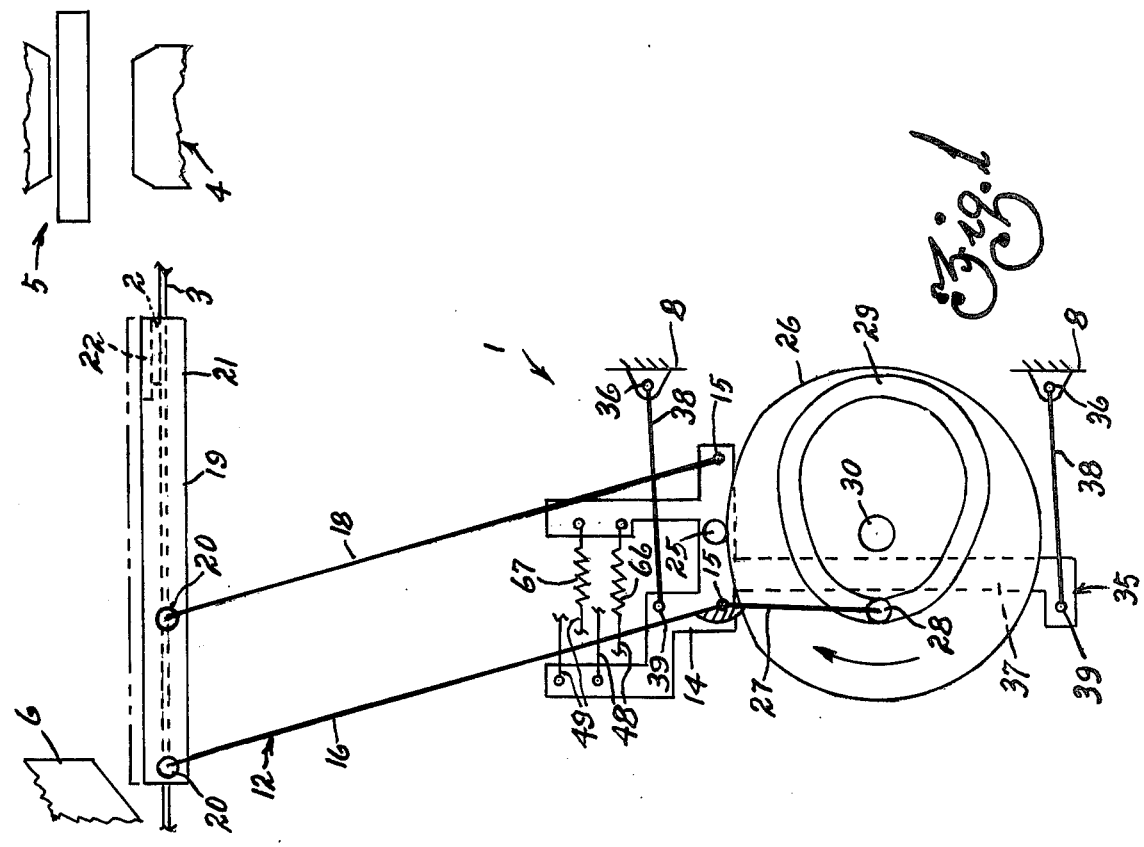

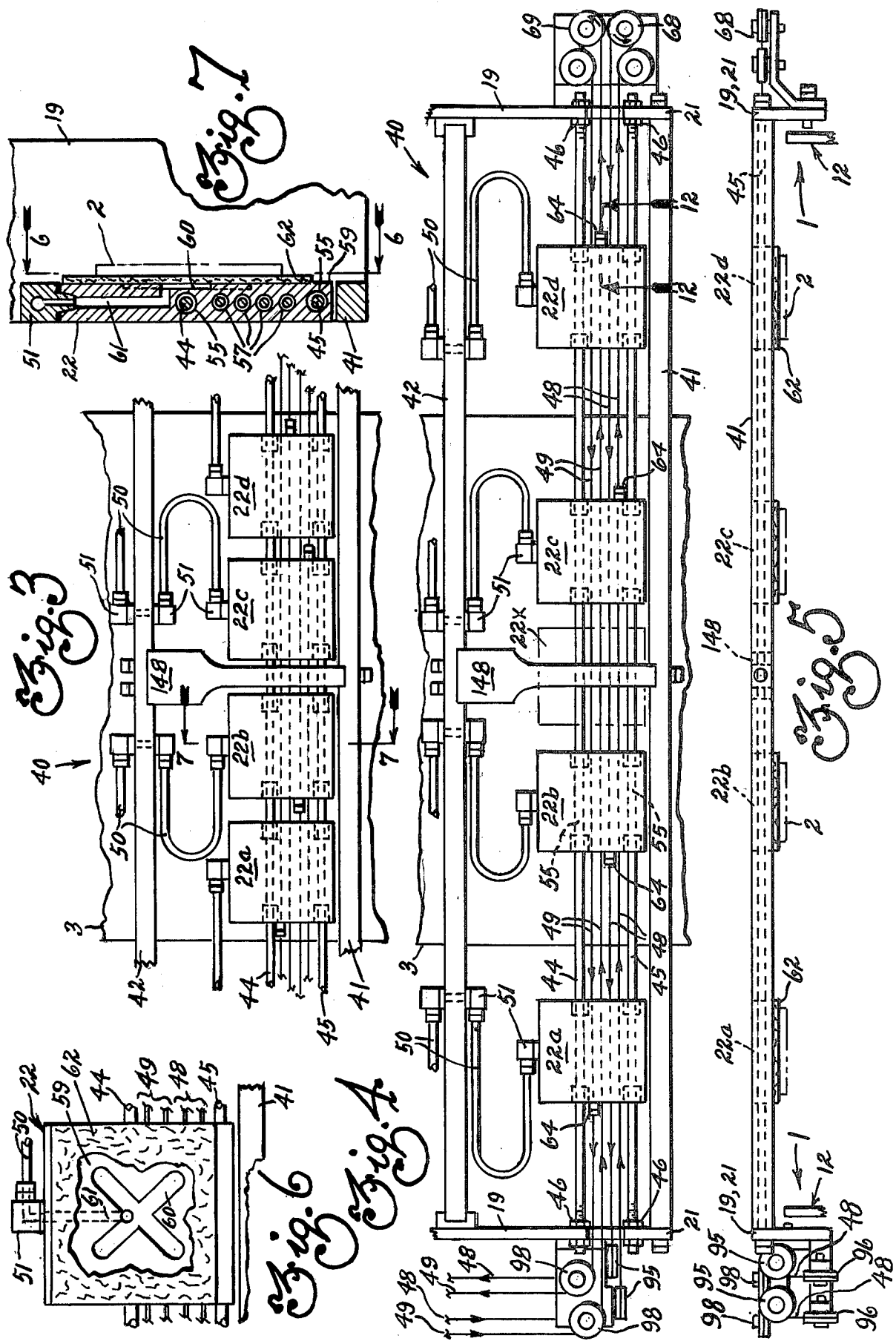

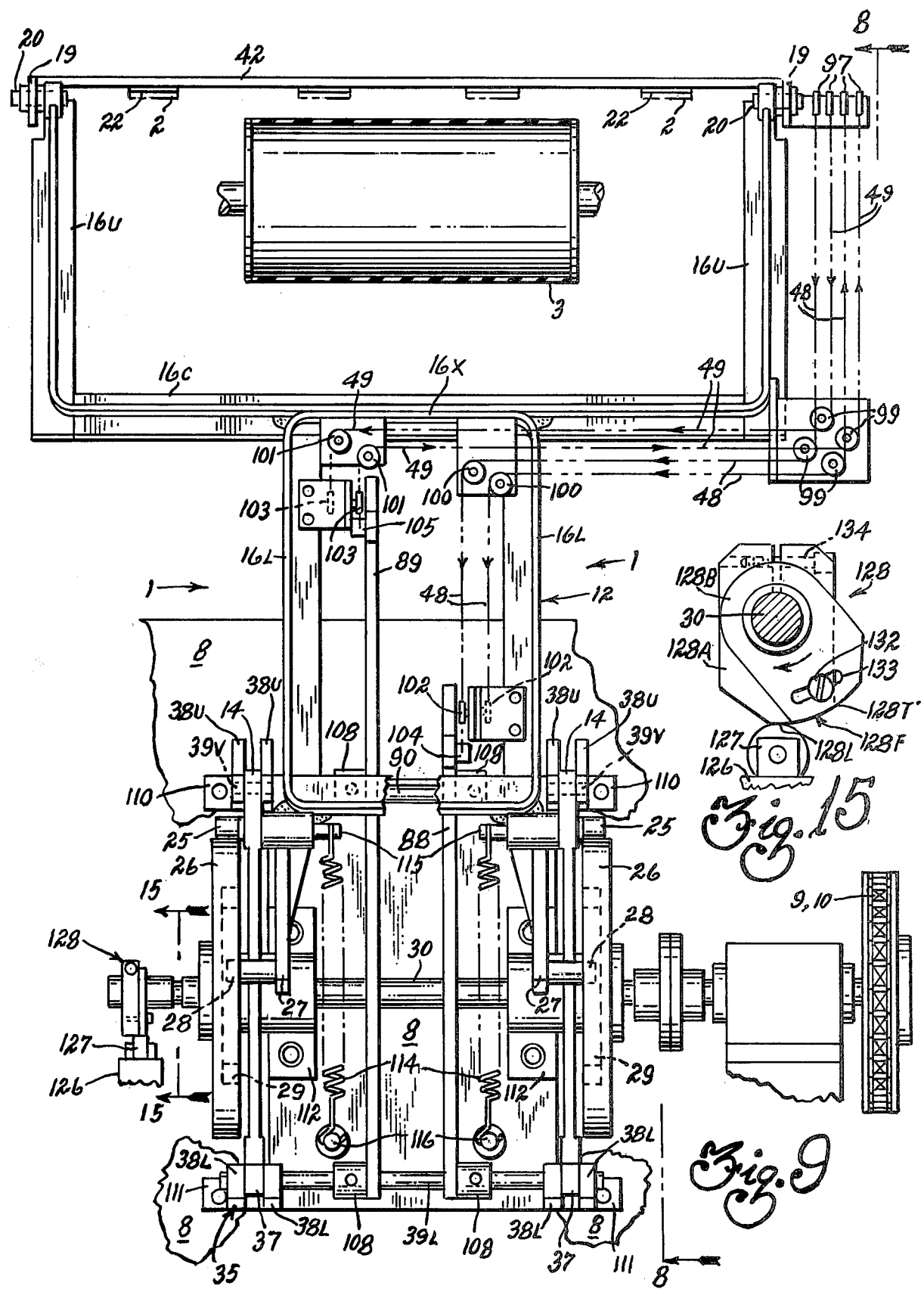

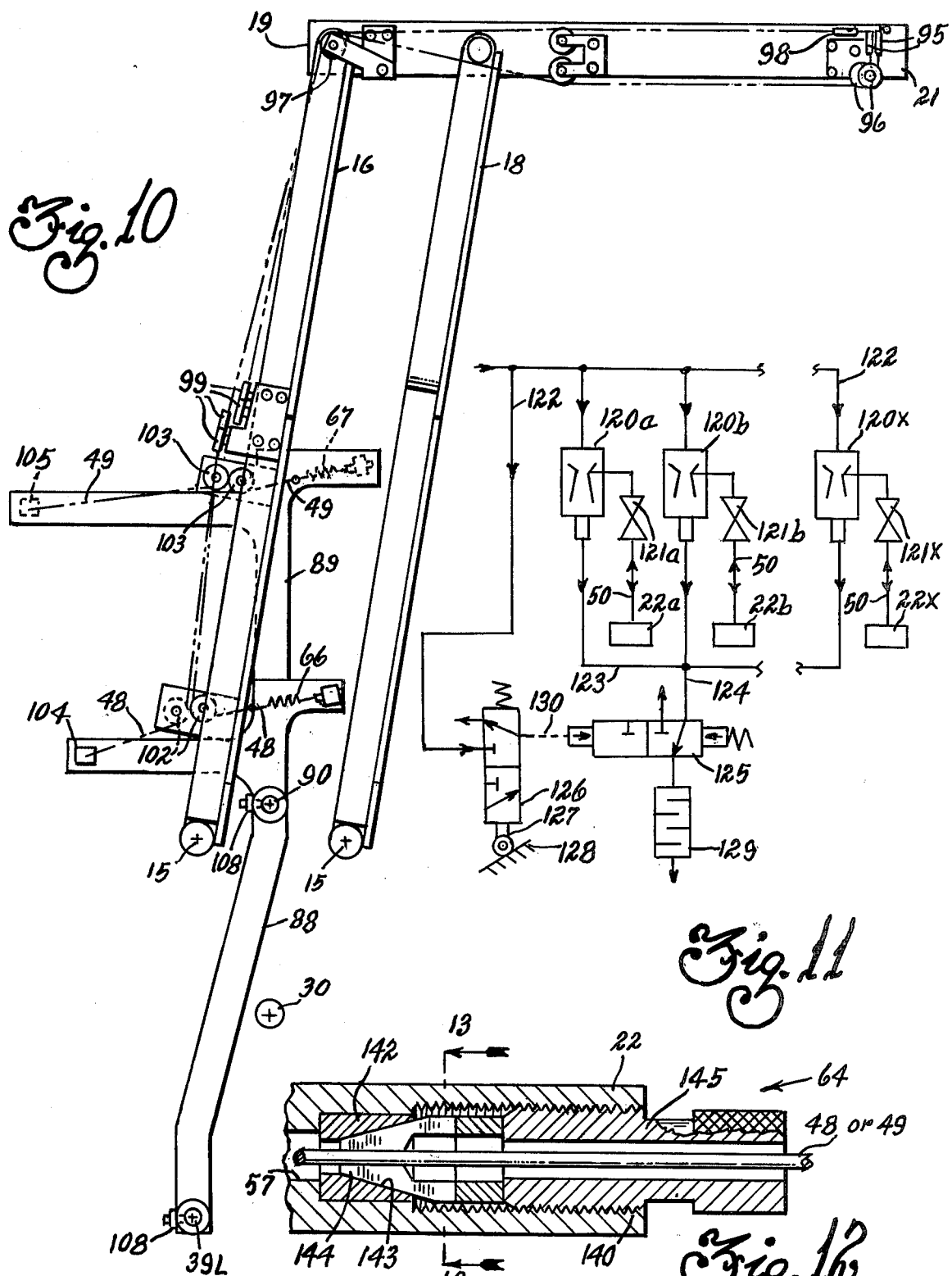

MECHANISM TO TRANSFER WORKPIECES BETWEEN LOCATIONS

SUMMARY AND BACKGROUND

The present invention relates to an improved mechanism to transfer workpieces between locations. One aspect of the invention is an improved mechanism for transferring square pieces of thermoplastic resin from a heating means to a thermoforming means. An aspect of the invention is an article handling device to convey small flat workpieces between locations while spreading them apart laterally. A specific aspect of the invention is an improved mechanism for transferring heated square flat workpieces of biaxially orientable resin such as polystyrene (called chips) from an oven exit to a die assembly of the general kind used in U.S. Pat. Nos. 3,739,052 and 3,947,204 in connection with which the invention will be described.

The aforesaid U.S. Patents describe a system for shaping thermoplastic resins which biaxially orients the material in the product in a system that heats one or more chips to orienting temperature and then forges a preform from which the final product — such as a container — is thermoformed.

Transfer of the workpiece, which is preferably a square piece of the resin being worked and which will hereafter be called a "chip", must occur in such a way that the chip retains uniformity of temperature, is not unduly or unevenly chilled, and suffers no appreciable temperature drop nor any physical distortion from its flat state. The ultimate product which may take the form of a deep dish or tub of the kind butter, cottage cheese, and margarine are packaged in, may be substantially distorted or defective if the chip is physically distorted or thermally nonuniform. Hence, the transfer mechanism should work fast enough to minimize temperature changes and heat loss while at the same time avoiding physical distortion of the work. Of course, the transfer device must accurately pick up and deliver the chip at its initial and final locations.

To this end the present invention includes a mechanism for transferring workpieces substantially horizontally from a first location to a second location comprising a machine frame; a four bar mechanism with driver and follower links vertically opposite each other; a workpiece engaging means supported on said follower link; vertical driving means to substantially vertically drop then lift said mechanism periodically by engaging said driver link; constraining means supported from said frame to guide said mechanism to move in a substantially vertical path relative to said frame; and horizontal driving means supported from said frame to substantially horizontally oscillate said follower link from said lift position to said second position and return; both said vertical and horizontal driving means operating in timed relation to each other to vertically drop said mechanism sufficiently for a workpiece at said first location to be engaged by said workpiece engaging means before substantial oscillation to said second location has occurred.

A preferred embodiment of the invention has two interlinked four bar mechanisms one of which is the constraining means mentioned above. Rotating cams are the vertical and horizontal driving means in the preferred embodiment.

Another feature of the present article handling means is a transfer mechanism as described above having a workpiece engaging means that simultaneously transfers a plurality of chips and spreads the chips further apart during their relocation. This comes about because the chips arrive from a relatively narrow apparatus (such as a narrow oven having a narrow conveyor belt) and must be placed in more widely dispersed forming means such as a die as mentioned in one or more of the above patents.

Other objectives, advantages, and features of the present invention will become apparent from a reading of the following disclosure and claims in conjunction with the drawings wherein:

FIGS. 1 and 2 are schematic drawings of the mechanism, respectively, in the fully withdrawn position to pick up a chip (withdrawn drop) and in the fully extended position delivering a chip at the second location with being shown in ghost lines, respectively, the withdrawn lift position and the withdrawn drop positions;

FIG. 3 is a partial plan view of the contracted position of the laterally expandable chip pick up means as they would be spaced in the FIG. 1 position;

FIG. 4 is a plan view of the follower of FIG. 1 showing a plurality of a workpiece engaging means or chip pick up means laterally extended to the delivery or chip dropping position of FIG. 2;

FIG. 5 is a front view of the device of FIGS. 3 and 4 spaced as in FIG. 4;

FIG. 6 is a bottom view of a chip pick up means, a vacuum pad, as seen along section 6—6 of FIG. 7 and with the fiber mat partly cut away;

FIG. 7 is a cross-section of the vacuum pad along section 7—7 FIG. 3;

FIG. 9 is a front view of the mechanism of FIGS. 1, 2 and embodiment of FIG. (i.e. as viewed from the left of 1, 2, 8) 8 with certain parts of the cables and pulleys added;

FIG. 10 is a partial side view like FIG. 8 showing the cable system parts omitted from FIG. 8;

FIG. 11 is a schematic of the vacuum system for operating the pads of FIGS. 3-7;

FIG. 12 is an enlarged cross-section of an adjustable cable clamp showing the cable connections along 12—12 of FIG. 4;

FIG. 13 is a cross-section along 13—13 of FIG. 12;

Figure 8:
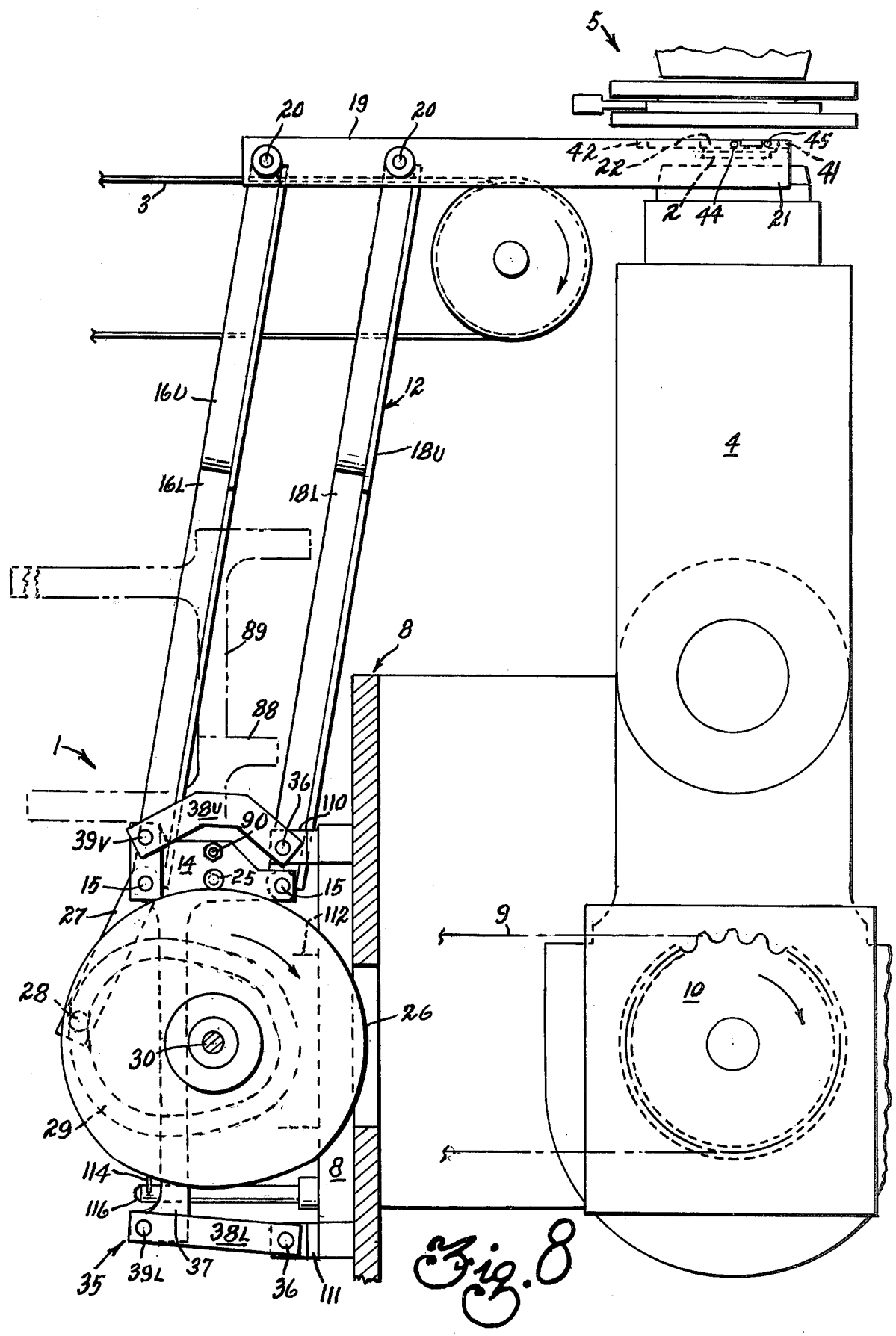
FIG. 8 is a side view of an embodiment of the mechanism of FIGS. 1, 2, omitting for clarity a drive sprocket on the mechanism and parts of the cable system (for laterally changing the chip spacing) with the cable anchor brackets in ghost lines.

FIG. 14 schematically presents a modification of the mechanism of FIGS. 1, 2; and FIG. 15 is a section along 15—15 of FIG. 9 showing an adjustable vacuum timing cam.

Throughout the drawings the same reference number is used to refer to the same part or parts although for the sake of clarity, various suffixes may occasionally be used. Cable travel direction upon spreading is shown by arrows, e.g. FIGS. 2, 4, and 9.

DESCRIPTION OF SCHEMATIC FIGS. 1 and 2

These Figs. illustrate a mechanism 1 for transferring workpieces or chips 2 substantially horizontally between predetermined locations which are illustrated here as a conveyor belt 3 and the moving anvil or hammer 4 of a forging system 5 (constructed per the above U.S. patents) respectively. Hammer 4 is the slide of a slider crank drive which FIG. 8 shows at bottom dead center, the preferred chip loading forge position. The conveyor belt 3 advances periodically, stops for an instant while the mechanism 1 picks up the chip or chips and then repeats the cycle. The conveyor belt comes out of the oven or other heating device 6 which heats the chips to a temperature appropriate for forging, e.g. in the range from 265° to 275° F preferably about 270° F where the chip is made of polystyrene resin.

In practice a pair of such mechanisms 1 spaced apart by other structure as in FIGS. 8, 9 are preferred. The kinematics are more easily described with the schematic of FIGS. 1, 2.

The mechanism 1 is mounted on a machine frame 8 and preferably is driven from a power source common with the hammer 4 as by means of the chain and sprockets 9,10 shown in FIGS. 8,9. A common power source and drive train 9,10 provides a convenient structure to insure the proper time relationship of the system. Pivotally supported from the machine frame is a four bar mechanism 12 which is caused to move both vertically and horizontally to move the chips as aforesaid. At the bottom of the mechanism is a driver link 14 revolvably connected at bearings 15 to front and rear connecting rods 16,18 which in turn are connected to the follower link 19 (also called side arm 19) by bearings 20. Rods 16,18 are proportioned to amplify motion. The bearings 20 preferably are self-lubricated journal bearings. The follower has a forwardly extending portion 21 on which is mounted at least one workpiece engaging means 22 which preferably comprises a vacuum pad constructed as shown in FIGS. 3-7. If desired, there may be a plurality of the vacuum pads 22 and they may be caused to spread themselves laterally as described with reference to FIGS. 3-10 especially FIGS. 4, 5, 8, 10. A corresponding plurality of hammers 4 and dies are provided to receive the chips.

The mechanism has horizontal and vertical driving means 25-30 which will now be described. The vertical driving means comprises a cam follower 25 preferably of a roller type on driver 14 that is driven by surface cam 26 to cause the entire four bar mechanism 12 to rise and fall substantially vertically between the ghost and solid line positions illustrated in FIGS. 1,2. Cam follower 25 is located between bearings 15.

The horizontal driving means comprises an integral downward extension 27 of the rear connecting rod 16 having at its lower end a cam follower 28 that engages a face cam 29. The face cam is a groove in the same cam plate forming cam 26 designed to cause substantial horizontal oscillation of the follower or side arm 19,21 so that the chip 2 is moved from the conveyor belt 3 to the hammer 4 and then to cause the follower to retract to the home position (ghost FIG. 1 or solid retracted FIG. 2) so that the cycle can repeat itself. The vertical drive causes the vacuum pads 22 to move up and down (respectively ghost and solid FIG. 1) sufficiently to engage a chip on the belt.

A preferred mode of operation would begin with the follower 19,21 fully retracted (ghost FIG. 1) at which time the follower holds the vacuum pad 22 or other work engaging means sufficiently high off the conveyor belt 3 that a chip cannot be engaged. The surface cam 26 then causes a vertical drop of the four bar mechanism 12 to the position shown in solid lines in FIG. 1 (or ghost retracted FIG. 2) at which time the chip is engaged by the vacuum pad 22. The surface cam 26 then causes a rise preferably by an amount sufficient to return the mechanism to its dotted line position of FIG. 1. When the vertical rise of follower 19 has been concluded, cam 26 enters a dwell phase until the next cycle begins and the horizontal drive means 27-29 begins to operate and face cam 29 causes the follower (which now carries the chip) to swing from the raised position (ghost FIG. 1 and retracted solid FIG. 2) through a shallow arc to a position depicted in solid lines FIG. 2 where the chip is dropped on the hammer. The horizontal drive means 27-29 then returns the follower to the home position and the cycle is repeated. The face cam 29 has a dwell during the vertical fall and rise of cam 26.

Timing of events between the two cams is preferably achieved by forming them both on a single disc and nonrevolvably securing same on shaft 30 which is in turn revolved from chain and sprockets 9,10.

Both the vertical and horizontal drive means operate in timed relationship to each other as well as to the operation of the hammer and other parts of the forge system. Bearings 39V,39L connect leg 37 to the swing rods.

The mechanism also includes a constraining means 35 supported from the frame 8 to guide the four bar linkage 12 to move in a substantially vertical path (actually a shallow vertical arc) relative to frame 8. Preferably, the constraining means is a second four bar mechanism 35 that is rotatably connected to frame 8 at bearings 36, includes vertical leg 37 of driver 14, and contains two swing rods 38 with frame 8 as the fixed link.

Preferably, as shown, both four bar mechanisms 12,35 are of the parallelogram type.

Although the vertical motion of the four bar mechanism 12 is constrained by the means just described, its horizontal motion is also constrained and limited by the nature of the face cam and follower system 28,29.

The Chip Spreading Means of FIGS. 3-7

It is contemplated that the present system will be used to simultaneously transfer a plurality of chips between locations. By way of example is described the transfer of four chips simultaneously and illustrate a means for doing so in FIGS. 3-7.

The chips come out of oven 6, for example, closely spaced together across the conveyor belt 3 on which they are traveling, and the belt is stopped so that each chip is directly underneath one of the vacuum pads 22 in FIG. 4.

As should be apparent from FIGS. 4-10, the invention in practice comprises two spaced apart mechanisms 1 as described for FIGS. 1,2. The chip spreader means 40 are supported between and on the mechanisms 1.

In operation the mechanism 1 will turn on its vacuum, pick up the chips as described above (spaced per FIG. 3), and then will space these chips apart by spreading the several vacuum pads 22 (designated as 22a, 22b, 22c, 22d) to the spacing as illustrated in FIG. 4 while simultaneously moving same to a position exactly above the hammer for each chip. The vacuum is of course turned off momentarily (FIG. 11) to drop the chips at that exact position and then the system repeats itself.

The lateral spacing means comprises a frame consisting of front and rear rails 41, 42 horizontally spacing apart the pair of side arms (followers) 19,21. A pair of guide rods 44,45 conveniently made of screw machine stock are secured by nuts 46 between the two side arms. The vacuum pads are slidably supported on the guide rods to move laterally. Cables 48,49 and suitable pulleys cause these vacuum pads to move as manner described below.

A conduit through which vacuum can be drawn through each vacuum pad 22 to engage the chips and positive pressure applied to release chips is formed by flexible conduits such as plastic vacuum tubing 50 suitably reinforced so it won't collapse and suitable standard fittings 51.

Each pad has a pair of guide bores 55 (FIG. 7) in which the guide rods are slidably received and also has a plurality of lateral holes 57, one for each cable, which holes are large enough to let the cables run freely therein because the pad is not connected to three of the four cables. The bottom or chip engaging surface 59 of each vacuum pad is essentially flat with an X-shaped groove 60 cut in it. The groove is connected by a suitable vacuum passage 61 to vacuum fitting 51. A mat 62 of thermally insulative porous or gas permeable material, such as a fibrous mat and preferably a woven glass fiber mat, covers the X-shaped groove and functions in several respects: it insulates the carefully heated chip 2 from chilling effects of an unheated vacuum pad 22 and it also allows flow of air or other gas that is drawn into or expelled out of the vacuum system, thus keeping the latter clean.

Each pad is connected to one end of this respective cable by a suitable means 64 such as a drop of silver solder if a permanent connection is desired or by an adjustable cable clamp 64 (FIG. 12) to facilitate setting up and operating adjustments.

Cable System for Spreading Vacuum Pads

Each of the vacuum heads 22a . . . 22d is connected to a cable 48,49 (FIGS. 4,12). Each cable is connected in turn between the side arms 19 and brackets 88, 89 that are kinematically part of the driver link 14 (FIGS. 1, 2, 9, 10). One end of each cable is connected to a spring 66,67 or other stretchable and tension maintaining means. Each cable 48,49 at its approximate center portion is wrapped around a reversing or spreader pulley 68,69 respectively, and one vacuum head is secured to the portion of the cable on each side of such pulley. As best seen in FIGS. 3-5 this results in the heads 22a . . . 22d being arranged in pairs which then spread apart simultaneously responsive to cable motion (arrows show directions of motion to spread in FIG. 4 and all Figs.) as the transfer mechanism is moved from its retracted and lifted to fully advanced lifted position (ghost FIG. 1 to solid FIG. 2). The vacuum heads simultaneously move closer together responsive to the reverse of the aforesaid motion. A plurality of idler pulleys are supported on the follower or side arm, connecting rods 16,16 and the driver link 14. In addition, one end of each cable is anchored to link 14 as well as having a spring 66,67 anchor to link 14 for the other end.

As best illustrated in FIGS. 1, 2, 9 and 10, when read together with FIGS. 3-8 it will be appreciated that the ends of each cable are anchored opposite each other and to the driver link 14 at different radii to provide different travels to the pair of pads 22a,22d or 22b,22c connected to them. As seen from FIGS. 3, 4, the two outermost pads 22a and 22d must travel about twice as far as the innermost pair of pads 22b, 22c. This difference in travel along the guide rods 44,45 is achieved by hooking the ends of the cable at different radii on link 14 (brackets 88,89) or for that matter at different distances from the side arm forward ends 21. Cable 49 furnishes the greatest travel and therefore is located the greatest distance from the cam rotation center 30 and cable 48 which furnishes the short travel of the inner pair of pads 22b,22c is on a shorter radius to cam center 30.

It will be appreciated that FIGS. 1 and 2 schematically illustrate driver link 14 (with leg 37) as being in one piece and having the cable ends 48,49 connected to brackets forming a part of driver 14. A preferred construction has a built up link 14 achieving kinematically the same end with light weight and low inertia illustrated in FIGS. 8-10 where respective short and long cable anchor brackets 88,89 are shown secured between the right and left hand constraining means 35 which comprises a second four bar mechanism already described. The brackets 88,89 are shaped respectively as in FIGS. 8 and 10 with the longer brackets 89 anchoring the ends of cable 49 and the shorter 88 anchoring the ends of cable 48. The two brackets are advantageously secured into place by cross members 39L and 90 (FIGS. 8, 10) which in effect makes them integral for motion purposes with driver link 14.

The use of an open framework type of built up structure using tee section as shown not only for linkages 12, 35 but other parts of the mechanism reduces the moving masses, hence reduces inertia forces.

The cable and pulley system is illustrated in FIGS. 4, 5, 9 and 10. The pulleys are all supported from or on connecting rod 16 or follower 19 to provide motion of the pulley-cable system relative to driver 14. The pulleys 68,69 in FIG. 4 are to reverse the directions of motion of opposite ends of the cable hence achieving the spreading or contracting action as the case may be. The other pulleys are means to keep the cables from becoming tangled while guiding same between their moorings with 88,89 and pads 22 and exposing same for assembly, adjustment, and so forth. As seen in FIGS. 4 and 5, a first pair of vertical pulleys 95 turn cable 48 down and then a second pair of such pulleys 96 (FIGS. 5 and 10) turn the cable another 90° so they run approximately parallel with side arm 19 up to the follower rear pulleys 97 where 48 and 49 as well are all turned 90° down.

The ends of cable 49 are brought to horizontal idlers 98 where they are turned 90° to the said follower pulleys 97.

Both cables descend from pulleys 97 to corner pulleys 99 which are mounted on a bracket at different heights (see FIG. 10) so the cables don't tangle while turning 90° to connecting rod pulleys 100 and 101 which are similarly on brackets or lugs on the frame forming rod 16. Cables 48,49 are respectively guided to anchor pulleys 102,103 and one end is fixedly anchored to bracket 88,89 at 104,105 and the other end of each is resiliently tied to the tension maintaining means 66,67.

The driver link 14 and its depending leg 37 is built up from a pair of links 14 as in FIGS. 8,9 and anchor brackets 88,89 and is secured to form an integral member by the crossbar 90 (FIGS. 8,10 just above cam follower 25) and the shaft 39L which forms the outer lower bearing. A boss-setscrew combination 108 preferably secures each anchor 88,89 to the bars 39L,90.

Structure of FIGS. 3-7 and 8, 9, 10

These Figs. illustrate a preferred embodiment of a structure as built to carry out the motions required for the schematic means of FIGS. 1, 2. As already noted, this preferably involves an open frame structure. For simplicity and ease of reading the same part numbers are used in FIGS. 1, 2 as in FIGS. 3-10 for like parts.

The follower 19 and its pick-up support extension 21 (FIGS. 1,2) thus translate into the open frame 40 of FIGS. 3-7 comprising left and right-hand followers 19 are spaced apart by front and rear rails 41,42 and guide rods 44,45. This structure enables supporting and spreading apart the pickup heads 22.

A pair of members (right, left) for each connecting rod 16,18 (FIG. 1,2) is provided in FIG. 9 in a structure (using 16 as representative of both 16,18) having a widely spaced upper frame comprising upper rods 16U (FIG. 9) spaced apart at the top by the follower frame 19 et seq. and cross bar 16C at the bottom: mounted on a lower, narrower frame having right, left rods 16L spaced apart by cross pieces 16X. Both frames 16U, 16L are rigid and rectangular. Cam follower 27 is secured to the lower frame 16L.

The constraining means 35 in similar fashion has an open structure with right- and left-handed pairs of members e.g. 14, 37 FIG. 9. Pairs of lugs 110,111 are fixedly secured to the frame 8 at locations to give the spacing required between, e.g. right and left links 14,37. Pairs of upper swing rods 38U and lower swing rods 38L are provided at each place (FIG. 9) thus using a total of four of each. The upper rod 38U is of obtuse shape (FIG. 8) in practice so as to provide clearance for insertion and removal of rod 90 in the links 14.

A pair of helical springs 114 bias the driver link 14 downward against follower 25 as viewed in FIGS. 1, 2, 8. Springs 114 are held in tension between an upper anchor boss 115 on the driver and a lower anchor rod 116 that is threadably secured to frame 8 and protrudes to a suitable place to anchor the other end of said spring.

The timing shaft 30 is supported in bearings 112 (FIG. 9) which preferably are pillow blocks bolted to frame 8. The vacuum timing cam 128 (FIGS. 9, 15) is secured on a cantilevered portion of shaft 30 and operates a cam follower that is part of pilot valve 127.

Vacuum System to Operate Vacuum Pad - FIG. 11

In this Fig. are schematically shown the respective pads 22a . . . 22b arranged in parallel as well as an extra vacuum pad constructed in similar manner, 22x. The vacuum system is shown schematically and basically consists of a number of systems in parallel (three are shown 22a . . . b . . . x) Each system has a venturi 120a,120b . . . 120x operating off compressed air to create a vacuum at the corresponding pad 22a,22b,22x for picking up and transferring a chip. This vacuum is turned off and the pressure reversed to give a positive pressure chip ejection by the expedient of blocking the venturi.

Referring to the system for pad 22a as representative compressed air is brought in from a suitable source such as a compresser not shown through manifold 122 to the venturi 120a where the vacuum line 50,51 is shown connected between the venturi throat and the vacuum pad 22a. In the vacuum line at a suitable place is a manual shut off valve 121. Downstream of the venturi 120a is an exhaust manifold 123 which gathers all of the exhaust gases from each venturi and directs same into an exhaust line 124 that passes through pneumatic valve 125 through muffler 129 to atmosphere.

The valve 125 is in turn operated by pilot valve 126 which has a mechanical follower means 127 actuated by cam 128 mounted on shaft 30. The pilot valve 126 is connected between the compressed air manifold 122 and valve 125 by pilot line 130 to shut off exhaust valve 125 when cam 128 actuates the pilot 126. This shutting off prevents any further exhaust from the venturi, causing a rapid pressure build up simultaneously in all venturi systems and ultimately causes air flow to reverse in lines 50,51 and the compressed air to flow out of the vacuum pad 22a and forcibly release the chip at each of the stations. After release, the cam 128 resets valve 126 whereupon the entire system returns to the "vacuum" and the cycle is repeated. Cam 128 is arranged to drop the chip 2 when the mechanism 1 positions the chip over the intended target, here the hammer 4 (FIG. 2) all in timed relation to the events of cams 26,29.

The cam 128 is preferably a built-up cam as shown in FIGS. 9, 15 having two segments 128A (having the leading edge 128L) and 128B (with trailing edge 128T) bolted together at 132. One segment has an arcuate bolt slot 133 to allow the two segments to be spread apart upon loosening the bolt to thereby lengthen the total cam face 128F hence regulate the time the vacuum is turned off. This cam assembly is preferably clamped on shaft 30 by bolt and nut assembly 134 — an arrangement that allows adjusting timing simply by loosening 134, turning 128 on the shaft, then tightening assembly 134.

Alternate Constraining Means

FIG. 14 schematically illustrates a mechanism 1 having an alternate type of constraining means 35 combined with a four bar linkage 12 as already described. For this reason only part of linkage 12 is shown.

Means 35 comprises a cam driven slide mechanism where the driver link 14 is the sliding member and is constrained between vertical ways (guides) 138 that are secured to the machine frame 8. Cam 26 — as above — is mounted on the shaft 30 to rotate in unison with cam 28. The short vertical rise and fall enable use of a cam drive but a longer vertical rise would recommend a slider crank mechanism with a crank and connecting rod substituted for the cam 26. The vertical ways 138 are preferably straight, as shown, but may be curved if desired.

Cable Clamp - FIGS. 12,13

This is a preferred clamp 64 for securing each pad 22 to its cable. Only one clamp per cable is needed and it facilitates adjustment of the pad position on the cable. Essentially, this is a compression fitting. The pad 22 serves as a housing or base.

One of the bores 57 is threaded at its outer end 140 and the diameter enlarged next to the threads to receive a compression bushing 142 having a tapered hole 143 therein. A tapered spring metal collet 144 cut into quadrants (FIG. 13) is fitted about cable 48 or 49 and placed adjacent hole 143. A hollow externally threaded locknut 145 is screwed along threads 140 into engagement with the chuck: continued screwing drives the collet 144 into hole 143 and clamps the cable. Backing out the locknut 145 releases the clamping.

Other Engaging Means Arrangements

Where lateral spacing changes are not desired, the engaging means 22 are secured in place on guide rods 44,45 using set screws and tapped holes drilled in from the top of the pad.

Where an odd number of chips (e.g. three or five) is to be moved with lateral spacing it is preferred to fixedly secure one engaging means 22x (dotted in FIG. 4) in the middle of the front and rear rails 41,42 e.g. at the position of center brace 148 and to have a pair of means such as 22b,22c (for three chip transfer) or two pairs 22a ... 22d as illustrated (FIGS. 3-5) arranged on each side of center. With such an arrangement, the pairs 22 move laterally but the fixed like 22x stay put.

What is claimed is:

1. A machine for transferring a workpiece substantially horizontally from a first location to a second location comprising
    a machine frame;
    a four bar mechanism with a pair of approximately vertical connecting rods between a driver link at the bottom and follower link at the top;
    a workpiece engaging means supported from said follower link;
    vertical driving means to substantially vertically drop then lift said four bar mechanism periodically by engaging said driver link;
    constraining means supported from said frame to guide said four bar mechanism to move in a substantially vertical path relative to said frame; and
    horizontal driving means supported from said frame to substantially horizontally oscillate said follower link from one of said drop and lift positions at one said location to one of said positions at the other said location and return;
    both said vertical and horizontal driving means operating in timed relation to each other to vertically lift said four bar mechanism sufficiently for a workpiece at said first location to be engaged by said workpiece engaging means before substantial oscillation to said second location has occurred.

2. A mechanism according to claim 1 wherein said four bar mechanism is a parallelogram linkage.

3. A mechanism according to claim 1 wherein said driver and follower are of equal length between their respective joints to the other links of the four bar mechanism.

4. A mechanism according to claim 1 having another four bar mechanism spaced horizontally from the first said four bar mechasnim with said workpiece engaging means supported between the follower links thereof.

5. A mechanism according to claim 4, having an additional one of each said drive means for driving said another four bar mechanism.

6. An apparatus for simultaneously transferring a plurality of workpieces according to claim 4 further comprising a corresponding plurality of said workpiece engaging means supported as aforesaid.

7. An apparatus according to claim 1 wherein said workpiece engaging means comprises a vacuum pad.

8. An apparatus according to claim 7 wherein said vacuum pad has thermal insulation on its workpiece engaging face whereby the workpiece is thermally insulated from said vaccum pad face.

9. An apparatus for simultaneously transferring a plurality of workpieces according to claim 1 further comprising a plurality of said workpiece engaging means supported from said follower link.

10. Apparatus according to claim 9 further comprising means to change the lateral spacing of said workpiece engaging means as said workpieces are moved between said locations.

11. Apparatus according to claim 10 wherein said means to change lateral spacing comprises cross machine guides supported from said follower and vacuum pads arranged to laterally slide on said guides.

12. Apparatus according to claim 11 further comprising at least one workpiece engaging means arranged to move to each side of center, at least one cable for every two such means, an idler pulley supporting the central region of said cable, and the ends of said cable on opposite sides of said pulley being secured — one resiliently — to said constraining means.

13. Apparatus according to claim 1 wherein said vertical driving means comprises a cam follower mounted on the driver link of said four bar mechanism and a cam in driving relationship to said follower.

14. Apparatus according to claim 13 wherein said cam follower is mounted on said driver link between joints thereof with the connecting rod, said cam is a rotary disc cam with a symmetric rise, fall and dwell.

15. Apparatus according to claim 1 wherein said constraining means is four bar linkage wherein one link comprises a portion of said machine frame.

16. Apparatus according to claim 1 wherein said constraining means is a second four bar linkage of parallelogram proportion wherein one link is a portion of said machine frame and the parallelogram link opposite said machine frame is integral with the first said four bar mechanism driver link.

17. Apparatus according to claim 16 further comprising an additional four bar mechanism as aforesaid horizontally arranged relative to the first said four bar mechanism to form left and right hand subcombinations that operate in unison, a plurality of said workpiece engaging means supported between such subcombinations, and means to change the lateral spacing of said workpiece engaging means responsive to movement of said apparatus between said first to said second location.

18. Apparatus according to claim 1 wherein said horizontal driving means is a cam supported to move in the aforesaid timed relation to and with said vertical driving means.

19. Mechanism according to claim 1 wherein said horizontal driving means is a face cam formed by a groove in a disc and engaged by a follower supported fixedly from one of said four bar mechanism connecting rods.

20. Mechanism according to claim 19 wherein said cam follower is integral with one of the first said four bar mechanism connecting rods and the engagement of said follower within said groove operates to provide a constraint means as well as a drive means.

21. Apparatus according to claim 1 further comprising a drive shaft, and where said vertical and horizontal driving means respectively are rotary cams fixedly mounted on said drive shaft, a cam follower integral with a connecting rod on said four bar mechanism engaging said horizontal means cam and a vertical cam follower supported on said four bar driver link between its joints to said connecting rods to engage said vertical driving means cam.

22. An apparatus for transferring at least one workpiece substantially horizontally from a first location to a second location comprising
    a machine frame;
    first and second four bar mechanisms each with a pair of approximately vertical connecting rods between a driver link at the bottom and follower link at the top and connected horizontally opposite to the other said mechanism to move in unison;
    a workpiece engaging means supported between said follower links;
    vertical driving means to substantially vertically drop then lift said four bar mechanisms periodically by engaging one of said follower and said driver links;

constraining means supported from said frame to guide said four bar mechanisms to move in a substantially vertical path relative to said frame; and horizontal driving means supported from said frame to substantially horizontally oscillate said follower link from one of said drop and lift positions at said first location to one of said positions at said second location and repeat;

both said vertical and horizontal driving means operating in timed relation to each other to vertically lift said mechanism sufficiently for a workpiece at said first location to be engaged by said workpiece engaging means before substantial oscillation to said second location has occurred.

23. A mechanism according to claim 21 wherein each said four bar mechanism is a parallelogram linkage.

24. An apparatus according to claim 22 wherein said workpiece engaging means comprises a vacuum pad.

25. An apparatus according to claim 24 wherein said vacuum pad has thermal insulation on its workpiece engaging face whereby the workpiece is thermally insulated from said vacuum pad face.

26. An apparatus for simultaneously transferring a plurality of workpieces according to claim 22 further comprising a corresponding plurality of said workpiece engaging means supported as aforesaid.

27. Apparatus according to claim 26 further comprising means to change the lateral spacing of said workpiece engaging means as said workpieces are moved between said locations.

28. Apparatus according to claim 27 wherein said means to change lateral spacing comprises cross machine guides between said followers and said vacuum pads being arranged to laterally slide on said guides.

29. Apparatus according to claim 28 further comprising at least one workpiece engaging means arranged to move to each side of center, at least one cable for every two such means, an idler pulley supporting the central region of said cable, and the ends of said cable on opposite seats of said pulley being secured — one resiliently — to said constraining means.

30. A machine according to claim 27 wherein said means to change moves less than all of said engaging means.

31. Apparatus according to claim 22 wherein said constraining means is four bar linkage wherein one link comprises a portion of said machine frame.

32. Apparatus according to claim 22 wherein said constraining means is a four bar linkage of parallelogram proportions wherein one link is a portion of said machine frame and the parallelogram link opposite said machine frame is integral with the first said four bar mechanism driver link.

33. Apparatus according to claim 22 further comprising a drive shaft, and wherein said vertical and horizontal driving means respectively are rotary cams fixedly mounted on said drive shaft, a cam follower integral with a connecting rod on said four bar mechanism engaging said horizontal means cam and a vertical cam follower supported on said four bar driver link between its joints to said connecting rod to engage said vertical driving means cam.

34. Apparatus according to claim 22 further comprising a means to operate said workpiece engaging means to operate said workpiece engaging means to engage a workpiece at said first location and disengage same at said second location.

35. Apparatus according to claim 34 wherein said means to operate and both said driving means each comprises a cam, and a drive shaft on which said cams are mounted.

36. Apparatus according to claim 22 further comprising means to bias said first and second four bar mechanisms into engagement with said vertical and horizontal driving means.

37. A machine according to claim 22 wherein each said follower link has an extension rearwardly toward said second location and beyond said rods and said workpiece engaging means is supported between said extensions.

* * * * *